July 21, 1959     G. E. LILLIE     2,895,264

GAGE SYSTEM

Filed Sept. 16, 1955

Inventor
Gordon E. Lillie
Robert S. Toperzer Atty.

United States Patent Office 2,895,264
Patented July 21, 1959

2,895,264

GAGE SYSTEM

Gordon E. Lillie, Bellows Falls, Vt., assignor to Bryant Chucking Grinder Company, Springfield, Vt., a corporation of Vermont Application September 16, 1955, Serial No. 534,818

5 Claims. (Cl. 51—165)

This invention relates generally to gaging, and more particularly it relates to gaging the size of a hole in a workpiece.

It is an object of the present invention to provide a more highly sensitive gage structure to monitor the operations of an internal grinding machine.

It is another object to provide electronic apparatus responsive to the gage structure in a manner whereby the operations of the machine on a particular workpiece are caused to cease when the hole being ground therein reaches a predetermined size.

It is a further object to provide a gaging system of the above-mentioned character which is adapted to make a number of size determinations within a relatively short time interval, and yet which is extremely reliable in operation.

Figure 1:
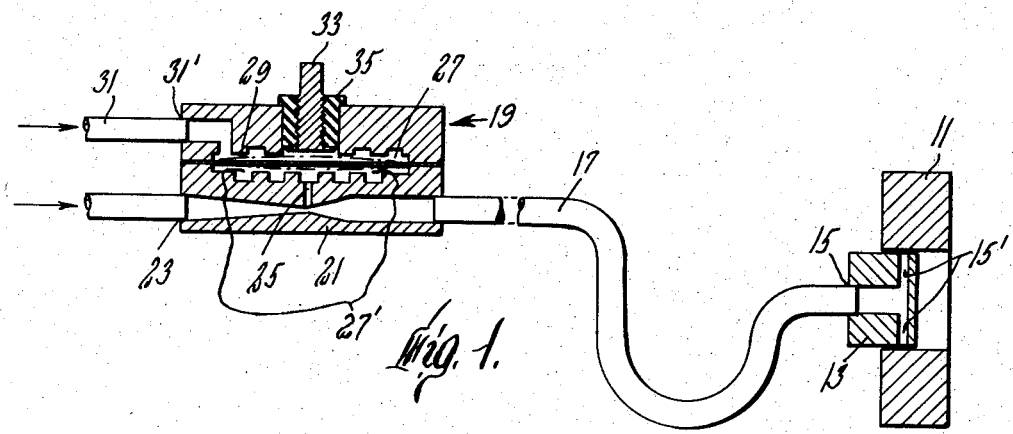
Figure 2:
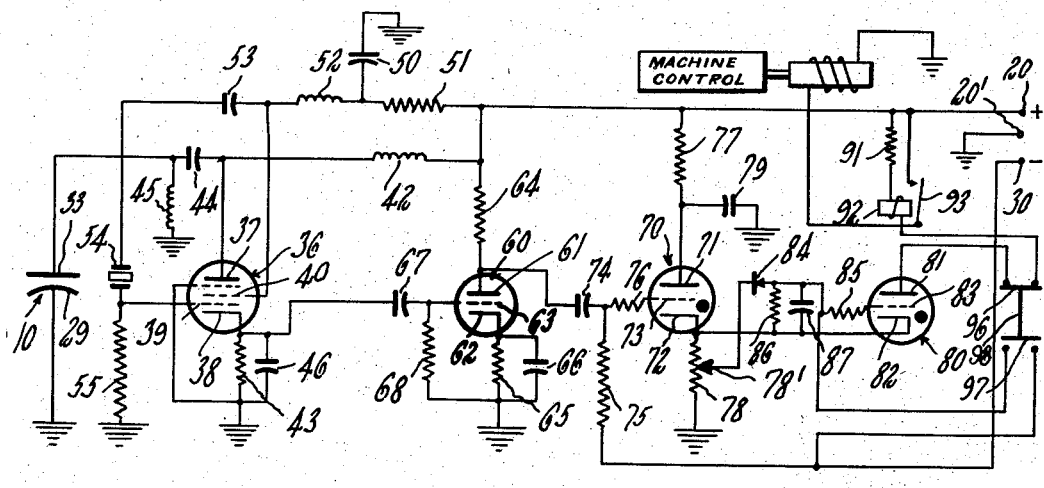

The novel features of the invention, together with further objects and advantages thereof, will become more readily apparent when considered in connection with the accompanying drawing in which:

Fig. 1 is a cross-sectional view of the gage structure according to the invention; and Fig. 2 is a schematic diagram of the electronic apparatus responsive to the gage structure of Fig. 1, also in accordance with the invention.

Referring now to Fig. 1, it will be observed that there is included in the system of the present invention a fluid plug gage 13 and a transducer structure 19 wherein a change in flow, resulting from a change in size of the hole in a workpiece 11 being ground, is converted into a change in pressure in a first chamber 27' relative to a constant reference pressure in a second chamber 27. Between the chambers is a diaphragm 29 which is flexed with a snap action between two positions depending on the magnitude and sense of the pressure differential and which acts to translate said flow representative pressure changes into a variation in the capacitance of an electrode or probe 33 with respect to ground. The plug gage 13, which has an axial bore 15 in communication with the peripheral wall of the plug through a pair of radial bores 15' is adapted for reciprocal movement in and out of the hole in the workpiece at each grinding pass of the grinding wheel in any convenient manner, for example as disclosed in Patent No. 2,585,533, issued February 12, 1952, to William J. Bryant, Thor H. Ljunggren and Willis F. Moore. A flexible hose 17 intercouples bore 15 with one end of a passage 23 of restricted cross section between its ends which is formed in the body 21 of the transducer structure 19, the other end of passage 23 being connected in turn to a source of air of constant regulated pressure. It should be understood in this regard, that hose 17 is merely illustrative, and that any mode of pneumatic coupling which permits relative movement between the plug gage and the transducer will be equally suitable for the purposes of this invention.

Intersecting the restricted portion of passage 23 at right angles is a vertical passage 25 communicating with chamber 27' which is centrally located in the body 21 of the transducer structure. As will be apparent to those skilled in the art, passages 23 and 25 comprise a venturi device whereby the pressure in chamber 27' is determined by the velocity of the air flowing past passage 25 which in its turn is dependent on the clearance between plug 13 and the workpiece 11. To sense the pressure as aforementioned, there is provided a snap-action diaphragm 29 made of conductive material or having a conductive surface coating, and being rigidly held between the mating halves of the body 21 which form the chambers 27' and 27, the latter being connected through a passage 31' and a supply line 31 to a source of reference air whose pressure is held substantially constant. Probe 33, which is seen to have a cylindrical shank and a disk-shaped head in close proximity to the diaphragm 29 completes the transducer structure. Although most conveniently probe 33 is formed entirely of conductive material, no direct electrical contact between the probe and the body 21 of the transducer structure is present. To accomplish this result, the probe is threaded into an insert 35 of insulating material in a vertical bore extending from the top of the body 21 into the chamber 27.

Referring now to Fig. 2, there is illustrated the electronic circuitry of the present invention which operates in conjunction with the above-described gage structure, and which comprises in essence an oscillator section including an oscillator tube 36, an amplifying section including an amplifier tube 60; a pulse generating section including a Thyratron tube 70; and a timing section including a Thyratron tube 80. Oscillator tube 36, which has an anode 37, a cathode 38, a control grid 39 and a screen grid 40, is adapted to operate at a fixed frequency only, so that detuning of the oscillator section produces a major change in the operating conditions of the tube. To this end, anode 37 is connected through a choke 42 to the positive terminal 20 of a source of anode supply voltage, the negative terminal 20' of the source being connected to a common point or ground. Cathode 38 is connected to ground through a cathode resistor 43 and a by-pass capacitor 46; and screen grid 40 is connected through the series combination of a choke 52 and a screen resistor 51 to the positive terminal 20. The junction of resistor 51 and choke 52 is connected to ground through a by-pass capacitor 50. Finally, control grid 39 is connected to the screen grid 40 through a coupling capacitor 53 and a piezoelectric crystal 54 of more or less optional resonant frequency, by way of example seven megacycles per second. The oscillator section is tuned to this frequency by a parallel resonant circuit including capacitor 10 and an inductor 45 connected between anode 37 and ground through a blocking capacitor 44. Capacitor 10, as shown diagrammatically in Fig. 2, represents the capacitance provided in the transducer structure between probe 33 and the remainder of the structure, especially diaphragm 29, which is connected to ground.

Coupled to the output circuit of the oscillator section, and more particularly to the cathode resistor 43, is a coupling capacitor 67 which in turn is connected to the control grid 63 of triode amplifier tube 60. The input voltage to amplifier tube 60 is developed across a grid resistor 68 connected from grid to ground, and the output therefrom is derived from an anode resistor 64 connected between the anode 61 of the tube and positive terminal 20. Completing the output circuit, is a bias resistor 65 connecting the cathode 62 of the amplifier tube to ground, and a by-pass capacitor 66 connected across resistor 65.

Under certain conditions to be described in detail hereinafter, amplifier tube 60 is adapted to fire Thyratron 70, and to this end, anode 61 is connected through a capacitor 74 and a resistor 76 to the control grid 73 of the Thyratron, whose anode and cathode have been designated by the numerals 71 and 72, respectively. Anode 71 is connected to positive terminal 20 through an anode resistor 77, and cathode 72 is conencted to ground through a cathode resistor 78. There is also provided a capacitor 79 between anode 71 and ground to extinguish the Thyratron 70, and a grid resistor 75 connecting the junction of resistor 76 and capacitor 74 to a terminal 30 whereat a negative bias potential is applied to properly bias the Thyratron.

Cathode resistor 78, associated with Thyratron 70, has an adjustable tap 78′, which is connected to the grid 83 of Thyratron 80 through a diode rectifier 84 and a resistor 85. Thyratron 80 controls the operation of a relay having its coil 92 interposed between the anode 81 of the latter Thyratron and an anode resistor 91. Resistor 91 is connected to terminal 20 and the cathode 82 of Thyratron 80 is connected to cathode 72 of Thyratron 70. Finally there is provided a timing circuit including a resistor 86 and a capacitor 87 connected to one another in parallel relation. This circuit is connected between the common junction of cathodes 72, 82 and the junction between diode 84 and resistor 85 in order to cause Thyratron 80 to respond to the firing of Thyratron 70 in a particular manner as will appear from the description of the operation of the system following.

After each grinding pass on the workpiece 11, plug 13 is advanced into the hole, and if the clearance between the plug and the workpiece is less than a predetermined amount, the relative pressures of the two air sources are so adjusted that the increase in pressure below the diaphragm, occasioned by the new orientation of the plug, is sufficient to snap the diaphragm upwardly into a convex configuration relative to probe 33. Upon retraction of the plug, the pressure below the diaphragm decreases radically causing the diaphragm to snap back into a concave configuration. As is well known to those skilled in the art, normal operation of the internal grinding machine requires that several passes by the grinding wheel be made before the hole in the workpiece is enlarged to the proper size, and hence diaphragm 29 normally undergoes a series of deflections during the course of the grinding operations on a particular workpiece. When the hole reaches the desired size, however, the increase in pressure in the lower compartment of chamber 27 resulting from the insertion of the plug into the hole will be insufficient to cause the diaphragm to snap upwardly, bringing to an end the series of deflections associated with the workpiece just completed.

To translate this action of the diaphragm into a signal to cause the operations of the grinding machine on each workpiece to cease as soon as the hole therein is within tolerance, the capacitance of probe 33 to ground, as determined primarily by the position of diaphragm 29, is so related to the circuit constants of the oscillator section, especially the inductance of inductor 45 that strong oscillation at the crystal frequency will take place only with diaphragm 29 in its normal concave position remote from the probe 33. Therefore, each time the diaphragm is deflected upwardly thereby, increasing the capacitance of the probe with respect to ground, the oscillator will cease to function normally with the result that its anode current will greatly increase momentarily, producing a positive voltage pulse across resistor 43. In this regard, the oscillator section may be likened to a very high Q resonant circuit which is detuned by a variation in one of its parameters, in this case a variation in the capacitance of probe 33 to ground as is occasioned by the deflection of diaphragm 29. As a result, a negative voltage pulse will appear at the control circuit of triode 60 due to the differentiating action of capacitor 67 and resistor 68 on the positive pulse, thereby cutting off triode 60 which is normally conductive. This will cause the potential of the anode 61 of amplifier tube 60 to increase and so also increase the potential of the grid 73 of the Thyratron 70 sufficiently to fire Thyratron 70. When Thyratron 70 fires, there is produced across cathode resistor 78 a positive voltage with respect to ground, a portion of which is applied to the timing circuit including capacitor 87 and resistor 86 to charge the former, and thereby to maintain grid 83 sufficiently negative with respect to cathode 82, that Thyratron 80 is prevented from firing. So long as Thyratron 80 remains non-conductive, relay coil 92 will stay deenergized and the contacts 93 associated therewith will remain open. Contacts 93, in turn, are adapted to permit the operations of the machine on a particular workpiece to continue only so long as they remain open. This may be done in any convenient manner which will be obvious to those skilled in the art, so that no attempt has been made to illustrate a conventional grinding machine and its associated control circuitry.

According to the invention, it is required, however, that Thyratron 70 cease to conduct shortly after the plug 13 has been advanced and withdrawn without a deflection of diaphragm 29 having taken place. To this end, the value of anode resistor 77 is made relatively high so that upon completion of the discharge of capacitor 79 through the anode circuit of the Thyratron 70 while in a conductive state, the voltage drop across resistor 77 will become so large that insufficient anode voltage will be present to maintain the Thyratron conductive. Hence, it will cease to conduct, and the discharge of capacitor 87 will begin to take place with resultant lowering of the grid bias of Thyratron 80. However, the time constant of the timing circuit, including capacitor 87 and resistor 86 through which the capacitor discharges, is so chosen with regard to the time interval between gaging passes, and hence between the pulses of charging current through capacitor 87 while the hole remains undersize, that before the voltage across the capacitor decreases sufficiently to cause Thyratron 80 to conduct, upward deflection of diaphragm 29 recurs, recharging capacitor 87 to its maximum value. In this way, Thyratron 80 is maintained in a non-conductive condition and contact 93 is kept open so long as periodic upward deflections of the diaphragm continue. When the hole in workpiece 11 reaches the desired size so that no upward deflection of the diaphragm takes place, however, the train of pulses initiated by the oscillator section will cease, permitting capacitor 87 to discharge until the grid bias on Thyratron 80 becomes so small that the Thyratron conducts, effectively energizing relay coil 92 and closing the relay contact 93. As mentioned heretofore, the relay contact 93, upon closure, is adapted to control the operation of the internal grinding machine such that no further grinding will take place until the workpiece is ejected and a new workpiece is mounted for grinding. During this intermediate period, the apparatus may be conditioned to begin anew the sequence of operations just described by energizing a relay 98 having a pair of normally closed contacts 96 in the anode circuit of Thyratron 80, and a normally open pair of contacts 97 connected between negative terminal 30 and capacitor 87. The former will then be operative to extinguish Thyratron 80, while the latter will provide capacitor 87 with an initial charge to keep the Thyratron extinguished until the first undersize measurement is made on the workpiece. This operation may be carried out automatically, if desired, by means of time delay relays, for example, actuated directly by contacts 93 or more preferably by the control circuit of the machine, in such a way that when plug 13 is permitted to reenter the hole of the workpiece for the first time in a grinding cycle, said relay 98 is deenergized and contacts 96, 97 are restored to their normal position as shown.

To accommodate different speeds of grinding passes so as to synchronize the operation of the system with that of the plug 13, the timing circuit of resistor 86 and capacitor 87 is connected to resistor 78 by means of an adjustable tap 78′. This tap is adjusted in such a way that if a grinding pass takes X seconds, the time delay will be greater than X seconds, but less than 2X seconds, for example 1.5X.

Various modifications of the embodiment illustrated herein, which are within the spirit and scope of the invention, will no doubt occur to those skilled in the art, so that the invention should not be deemed to be limited in all respects to this embodiment. Rather the invention should be deemed to be limited only by the scope of the appended claims.

What is claimed is:

1. In an internal grinding machine having a grinding wheel and means to repetitively insert the wheel in the hole of a workpiece to enlarge it and to withdraw the wheel to permit measurement of the hole size during regularly recurring intervals, in combination therewith control apparatus for automatically regulating the size of the hole, said apparatus including a fluid plug gage adapted to be alternately inserted into the hole of the workpiece and withdrawn therefrom during said intervals, means to provide to said gage a continuous supply of pressure fluid for discharge from said gage at a predetermined rate when the gage is inserted in a hole of desired size, said fluid being discharged at a higher rate while said gage is withdrawn from the workpiece and at a lower rate while the gage is inserted in a hole of insufficient size, and means responsive to an irregularity in said fluctuations between said higher and lower rates of fluid discharge, as when a said fluctuation fails to occur during one of said intervals, said last-named means being adapted to cause operation of said machine on a given workpiece to terminate.

2. The combination as claimed in claim 1 wherein the last-named means includes a diaphragm sensitive to the flow of fluid through said gage and adapted to be reciprocally flexed thereby between two opposite positions as the fluid flow rate fluctuates between said higher and lower rates.

3. The combination as claimed in claim 2 wherein the last-named means includes a conductive element to form in combination with said diaphragm an electrical capacitor whose capacitance fluctuates between two values according to the position of said diaphragm, and a circuit to provide electrical pulses in response to said capacitance fluctuations.

4. In an internal grinding machine having a grinding wheel and means to repetitively insert the wheel in the hole of a workpiece to enlarge it and to withdraw the wheel to permit measurement of the hole size during regularly recurring intervals, in combination therewith control apparatus for automatically regulating the size of the hole, said apparatus including a fluid plug gage adapted to be alternately inserted into the hole of the workpiece and withdrawn therefrom during said intervals, means to provide to said gage a continuous supply of pressure fluid for discharge from said gage at a predetermined rate when the gage is inserted in a hole of desired size, said fluid being discharged at a higher rate while said gage is withdrawn from the workpiece and at a lower rate while the gage is inserted in a hole of insufficient size, a diaphragm sensitive to the flow of fluid through said gage and adapted to be reciprocally flexed thereby between two opposite positions as the fluid flow rate fluctuates between said higher and lower rates, a conductive element to form in combination with said diaphragm an electrical capacitor whose capacitance fluctuates between two values according to the position of said diaphragm, means to produce pulses of electrical current in response to said capacitance fluctuations, means to store the energy of said pulses and to release said energy at a predetermined rate, and means to respond to a decrease of said energy below a predetermined level, said last-named means being adapted to cause operation of said machine on a given workpiece to terminate.

5. In an internal grinding machine having a grinding wheel and means to repetitively insert the wheel in the hole of a workpiece to enlarge it and to withdraw the wheel to permit measurement of the hole size during regularly recurring intervals, in combination therewith control apparatus for automatically regulating the size of the hole, said apparatus including a fluid plug gage adapted to be alternately inserted into the hole of the workpiece and withdrawn therefrom during said intervals, means to provide to said gage a continuous supply of pressure fluid for discharge from said gage at a predetermined rate when the gage is inserted in a hole of desired size, said fluid being discharged at a higher rate while said gage is withdrawn from the workpiece and at a lower rate while the gage is inserted in a hole of insufficient size, a diaphragm sensitive to the flow of fluid through said gage and adapted to be reciprocally flexed thereby between two opposite positions as the fluid flow rate fluctuates between said higher and lower rates, a conductive element to form in combination with said diaphragm an electrical capacitor whose capacitance fluctuates between two values according to the position of said diaphragm, a fixed frequency oscillator adapted to be detuned and retuned in response to said capacitance fluctuations, means for producing pulses of electrical current in response to recurrent changes in the tuning of said oscillator, a capacitor discharge circuit to store the energy in said pulses and to provide a voltage which decays at a predetermined rate in the absence of a said pulse, and a switching circuit responsive to a decrease in said voltage below a predetermined magnitude, said switching circuit being adapted to cause operation of said machine on a given workpiece to terminate.

References Cited in the file of this patent

UNITED STATES PATENTS

| | | |
|---|---|---|
| 1,993,830 | Conover | Mar. 12, 1935 |
| 2,116,232 | Blood | May 3, 1938 |
| 2,585,533 | Bryant et al. | Feb. 12, 1952 |
| 2,771,714 | Schmidt et al. | Nov. 27, 1956 |